United States Patent [19]
Sassano et al.

[11] 3,974,113
[45] Aug. 10, 1976

[54] LIQUID MODIFIED EPOXY RESINS AND THEIR PREPARATION

[75] Inventors: Daniel R. Sassano, Monroeville; Leonard E. Edelman, Pittsburgh, both of Pa.

[73] Assignee: Westinghouse Electric Corporation, Pittsburgh, Pa.

[22] Filed: Dec. 28, 1971

[21] Appl. No.: 213,164

[52] U.S. Cl. .................. 260/18 EP; 260/22 EP; 260/47 EA
[51] Int. Cl.² .............................................. C08J 3/02
[58] Field of Search......... 260/18 EP, 22 EP, 47 EA

[56] References Cited
UNITED STATES PATENTS

| | | | |
|---|---|---|---|
| 3,027,340 | 3/1962 | Masters.................................. | 260/18 |
| 3,051,671 | 8/1962 | Cummings............................ | 260/18 |
| 3,055,869 | 9/1962 | Wilson et al........................... | 260/22 |
| 3,397,160 | 8/1968 | Hicks..................................... | 260/18 |
| 3,501,425 | 3/1970 | Delius................................... | 260/22 |
| 3,578,633 | 5/1971 | Rossa..................................... | 260/18 |
| 3,594,340 | 7/1971 | Hollis et al............................ | 260/18 |
| R24,047 | 8/1955 | Crecelius.............................. | 260/18 |

FOREIGN PATENTS OR APPLICATIONS

| | | | |
|---|---|---|---|
| 205,972 | 3/1956 | Australia............................... | 260/18 |
| 518,956 | 11/1955 | Canada................................. | 260/18 |

*Primary Examiner*—Eugene C. Rzucidlo
*Attorney, Agent, or Firm*—R. D. Fuerle

[57] ABSTRACT

Liquid modified epoxy resins are prepared by reacting a drying oil with a diepoxide in the presence of certain alkali or alkaline earth metal compounds, preferably a lithium soap such as lithium ricinoleate. The drying oil may be modified by reacting it with maleic acid, maleic anhydride, or fumaric acid to increase the drying rate.

13 Claims, No Drawings

LIQUID MODIFIED EPOXY RESINS AND THEIR PREPARATION

BACKGROUND OF THE INVENTION

An epoxy resin may be in the form of a liquid or of a solid, depending on its epoxy equivalent weight. A solid epoxy resin may be used for coatings by applying a solution of it to an object and evaporating the solvent or by melting a catalyzed powder on the object. But it is not practical to use a solid epoxy resin as a potting or casting compound since a solvent cannot evaporate from deep within the casting and a melt of the resin would tend to polymerize prematurely.

While liquid epoxy resins would therefore be much more suitable as casting and potting compounds than solid resins, until now it has been difficult to control the flexibility of liquid epoxy resins. Plasticizers have been tried but they are extractable and the resin gradually becomes less and less flexible. Flexible hardeners have also been tried but they are expensive and give only a narrow range of flexibility.

While drying oils are easily made compatible with solid epoxies (see Canadian Pat. 518,956 and Australian patent 205,972), efforts to incorporate drying oils into liquid epoxy resings to flexibilize them have only recently succeeded through the use of a metal chelate catalyst. (See application of Robert H. Runk and Leonard E. Edelman, titled "Liquid Modified Epoxy Resins," filed Sept. 15, 1971 Ser. No. 180,873, now abandoned.)

Ordinarily, the metal chelate catalyst works quite well. But in certain applications it is desirable to prepare a tank car quantity of resin with an anhydride curing agent already mixed in for use over several months to avoid constantly having to mix up small batches. Under these circumstances it was found that the metal chelate catalyst accelerated the cure by the anhydride curing agent so that the resin could not be stored for long periods. This means that another curing agent had to be used or the resin had to be stored as two separate components, and neither solution was very satisfactory.

SUMMARY OF THE INVENTION

We have found that certain alkali or alkaline earth metal compounds will enable drying oils to react with diepoxides to produce liquid modified epoxy resins. These resins may be stored for long periods with anhydride curing agents without accelerating the cure. They are curable to give a wide range of flexibilities, from a near-liquid to a rigid solid, are relatively inexpensive, and are useful as potting and casting compounds, for forming coatings, and purposes for which other epoxy resins are used.

The resins are of a lighter color than resins made from metal chelate catalysts, which is often desirable for aesthetic reasons and which makes them easier to dye or pigment accurately.

Finally, the compounds are less expensive than the metal chelate catalysts and less is required.

DESCRIPTION OF THE INVENTION

In this invention about 20 to about 80% (all percentages herein are by weight) of at least one diepoxide is reacted with about 20 to about 80% of at least one drying oil in the presence of a catalyst of at least one compound of an alkali or alkaline earth metal. Large amounts of drying oil increase the flexibility of the resin but decrease its strength, and about 40 to about 60% diepoxide and about 40 to about 60% drying oil will produce a resin useful for most purposes. If the amount of catalyst is insufficient, the reaction will not proceed at a practical rate and if it is too great the diepoxide will cure before it reacts with the drying oil; about 0.0025 to about 0.1% (based on the diepoxide plus drying oil) is usually satisfactory, and preferably about 0.0025 to about 0.025% is used since more than about 0.025 is usually unnecessary.

The reaction should preferably be performed under a blanket of a gas (such as nitrogen) which is inert to all components to exclude oxygen which tends to thicken the resin by reacting with the drying oil. Carbon dioxide should not be used as it may insolubilize the soaps as carbonates. The diepoxide, drying oil, and catalyst are heated under non-hydrolyzing conditions (to preserve the epoxy functionality) at about 200° to about 250°C until the clear-pill stage is reached (i.e., the point at which a sample, cooled to room temperature, is clear and not cloudy) which is usually in about ½ to 1-½ hours. Lower temperatures require impractically long reaction times and higher temperatures may gel the drying oil. The reaction may be continued beyond the clear-pill stage if higher viscosities are desired. Also, a lack of clarity may result with the use of certain curing agents, such as polyamides, and this can be eliminated by heating for about a half-hour beyond the clear-pill stage.

The liquid modified epoxy resin thus formed may then be mixed with reactive diluents, fillers, thixotropic agents, reinforcing material, pigments, etc. as is known in the art. A curing agent is mixed in, and the resin is poured on a substrate or into a mold and is cured, typically at about 135° to 150°C for about 1 to 4 hours.

While almost any epoxy curing agent could be used, such as boro-chelates, amines, or polyamides, the preferred curing agents are anhydrides because they give a single package system having a long life. The preferred anhydride is methyl tetrahydrophthalic anhydride (MTHA) because it is an inexpensive low viscosity liquid which is soluble in the resin. Methyl nadic anhydride, though more expensive, is also a compatible liquid and works well. Other suitable anhydrides include trimellitic anhydride and its 4-acid chloride, pyromellitic dianhydride, 3, 3', 4, 4' — benzophenone tetracarboxylic dianhydride, tetrahydrofuran dianhydride, and cyclopentadiene dianhydride. The amount of anhydride used is preferably 80 to 95 stochiometric percent which means 80 to 95% of the anhydride equivalent weight which is the amount which will stochiometrically react with one epoxy equivalent weight. For example, using a diglycidyl ether of bisphenol A having an epoxy equivalent weight (EEW) of 190, the stochiometric amount of MTHA would be one gram equivalent weight which is 166 gms. Therefore, one would use 80 to 95% of that amount, or 70 to 83 gms of MTHA per 100 parts of diglycidyl either of bisphenol A. For mono-anhydrides the anhydride equivalent weight is the molecular weight and for di-anhydrides the anhydride equivalent weight is one-half the molecular weight.

The epoxy resin products of this invention have EEW's of less than 8000 and preferably of less than 5000 for more epoxy functionality and therefore faster and more complete cures. Their minimum EEW may be expressed as the EEW of the diepoxide divided by the percent of diepoxide in the composition. Their softening points are below 35°C and most commonly are below 10°C.

THE DIEPOXIDES

The diepoxides of this invention are diglycidyl ethers of diphenols of the formula

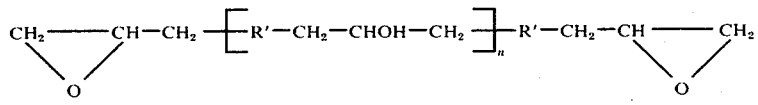

where R' is a diphenol radical such as

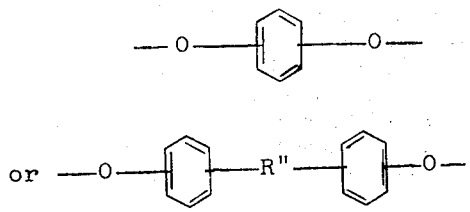

where R'' is —CH$_2$—, —O—,

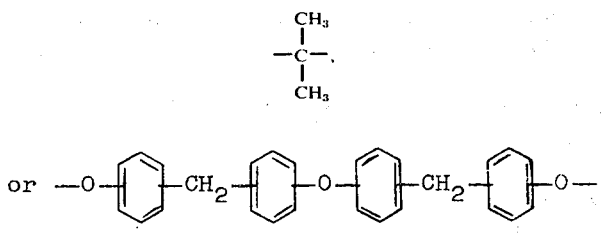

and $n$ is an average of less than 1 and preferably is an average of about 0. These low values of n are required in order for the diepoxide to be a liquid, which is necessary if the modified epoxy resin product is to be a liquid. It should be noted that n is an average value and commercially about 75 to 98% of the diglycidyl ether will have the exact value of n equal to 0 and the remaining 2 to 25% will be higher values of n. The preferred diphenol is bisphenol A (4, 4' - dihydroxy - diphenyl - dimethyl - methane) as it is inexpensive and readily available. Examples of other suitable diphenols include resorcinol, which produces less viscous resins than does bisphenol A, hydroquinone, and pyrogallol.

THE DRYING OIL

The drying oils of this invention lack hydroxyl functionality (which would etherify with the epoxy groups) and are typically natural products which are triglycerides of mixed unsaturated fatty acids. While natural drying oils are preferred due to their availability, drying oils may be prepared synthetically by stochiometrically reacting a fatty acid of the formula C$_{17}$H$_x$COOOH where $x$ is 28 to 33 with a polyhydroxy compound having 2 to 4 hydroxyl groups. Glycerine is the preferred polyhydroxy compound as it is inexpensive and readily available but pentaerythritol, trimethylolethane, trimethylolpropane, ethylene glycol, etc. and mixtures of polyhydroxy compounds could also be used.

Examples of suitable drying oils include linseed oil, oiticica oil, perilla oil, tung oil, dehydrated castor oil, soya oil, safflower oil, and fish oil; linseed oil, either raw or alkali-refined, is preferred as it offers the best compromise of drying properties and cost.

MODIFIED DRYING OILS

If the epoxy resin is to be cured with a curing agent, there is no need to use a modified drying oil. But if the resin is to be cured by exposure to oxygen, it may be desirable to use a modified drying oil which dries faster due to the presence of additional unsaturation.

The drying oil may be modified by reacting it with up to about 10% (based on the drying oil) maleic acid, maleic anhydride, or fumaric acid and about 1 to 1.5% times the amount of maleic acid, maleic anhydride, or fumaric acid, of at least one saturated aliphatic polyhydric alcohol having two to six hydroxyl groups. The presence of up to about 1.5% (based on the drying oil) of an ester-interchange catalyst such as lime is desirable to speed the reaction. The reactants are heated at about 230°C until an acid value of less than 14 is obtained, which is usually after about ½ to about 2 hours. The acid value is the number of milligrams of KOH required to neutralize 1 gram of the charge and it should be less than 14 in order to avoid excessively high viscosities when the modified drying oil is reacted with the diepoxide. The reaction should be performed under a blanket of inert gas such as nitrogen to prevent oxygen from thickening the drying oil.

Maleic anhydride and pentaerythritol are preferred as they work well and are readily available. Examples of other suitable polyols include dipentaerythritol, trimethylolethane, trimethlolpropane, glycerine, and ethylene glycol.

THE CATALYSTS

The catalysts are alkali or alkaline earth metal compounds which have a pH greater than 7 in water, and preferably which have a pH of less than 11 for 0.1 gm. equivalent weight per liter water as very alkaline compounds are so active that they are difficult to control. While catalysts which are insoluble in both the diepoxide and drying oil are operable, usually higher quantities are necessary and they present problems of settling. Therefore, the catalysts preferably should be soluble in either the diepoxide or the drying oil or both.

The preferred catalysts are salts (soaps) formed from monocarboxylic organic acids of the formula R-COOH where R is aliphatic from C$_8$ to C$_{20}$ and preferably from C$_{12}$ to C$_{20}$ as those catalysts are less expensive and more available.

Lithium soaps are preferred as they have about the right degree of activity so that they can be used in small quantities but not so small that errors are likely. Lithium ricinoleate is the preferred lithium soap as it has been used many times with no difficulties.

The following examples further illustrate this invention.

EXAMPLE 1

To a flask fitted with a stirrer, thermometer, and a nitrogen gas sparge was charged 300 gms raw linseed oil, 200 gms diglycidyl ether of Bisphenol A having an E.E.W. of 185 to 195 and a viscosity of 10,000 to 16,000 cps at 25°C sold by Shell Chemical Co. under the trademark Epon 828, and 0.125 gms lithium ricinoleate. The flask was heated to 205°C. After 20 minutes a clear pill had formed and the flask was heated for an additional ½ hour at 210°C to complete the reaction. The resulting liquid modified epoxy resin has a viscosity of E (Gardner-Holdt) and an E.E.W. of 495.

EXAMPLE 2

The procedures and quantities of Example 1 were used, except that the amount of lithium ricinoleate was reduced to 0.0125 gms and the flask was heated for 3 ¼ hours at 220°C. The resulting liquid modified epoxy resin had a viscosity of E (Gardner-Holdt) and an E.E.W. of 487.

EXAMPLE 3

Using the equipment of Example 1, the flask was charged with 250 gms linseed, oil, 250 gms Epon 828 epoxy resin, and 0.0125 gms lithium ricinoleate. The flask was heated to 210°C for about 4 ½ hours when a clear pill was obtained. Heating was continued for an additional ½ hour. The viscosity of the resulting liquid modified epoxy resin was I (Gardner-Holdt) and the E.E.W. was 388.

EXAMPLE 4

Example 1 is repeated using 300 gms tung oil, 200 gms diglycidyl ether of Bisphenol A having an E.E.W. of 512 and a viscosity of X (Gardner-Holdt), and 0.01 gms sodium linolenate. The results are similar.

EXAMPLE 5

Example 1 is repeated using 300 gms linseed oil modified by reaction with 5% maleic anhydride, 200 gms diglycidyl ether of Bisphenol A having an E.E.W. of 525, and a viscosity of X-Y (Gardner-Holdt), and 0.007 gms magnesium palmitate. The results are similar.

EXAMPLE 6

Using the procedure of Example 1 four samples were prepared with 60% linseed oil, 40% diglycidyl ether of Bisphenol A, a catalyst, and various amounts of a methyl tetrahydrophthalic anhydride curing agent and a methyltrioctyl phosphonium — dimethyl phosphate curing catalyst. The samples were then stored at 25°C and periodically their viscosity was determined. The following table gives the composition of the samples and their shelf life, the time required for their viscosity to reach 1500 cps.

| Catalyst | Curing Agent (per 100 parts DGEBA and drying oil) | Curing Catalyst (per 100 parts DGEBA and drying oil and curing agent) | Shelf Life (days) |
|---|---|---|---|
| 1% compound of isopropyl triethanolamine titanate and tri-m-cresyl borate | 30 | None | <12 |
| Same | 27.1 | 0.02% | 20 |
| 0.025% lithium ricinoleate | 30 | None | >370 |
| Same | 31.1 | 0.08 | 115 |

The above table show that lithium ricinoleate catalyzed resin with no curing catalyst had a shelf life of over 370 days (when the test was terminated) while the 1% titanate-borate catalyzed resin had a shelf life of less than 12 days. Also, while the titanate-borate catalyzed resin with 0.02% curing catalyst had a shelf life of 20 days the lithium ricinoleate catalyzed resin with four times as much curing catalyst had a shelf life of 115 days.

We claim:
1. A method of making a liquid modified epoxy resin comprising heating under non-hydrolyzing conditions to the clear pill stage
   1. about 20 to about 80% of at least one diglycidyl ether of a diphenol having the formula

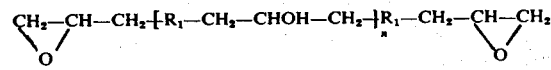

where $R_1$ is a diphenol radical selected from the group consisting of

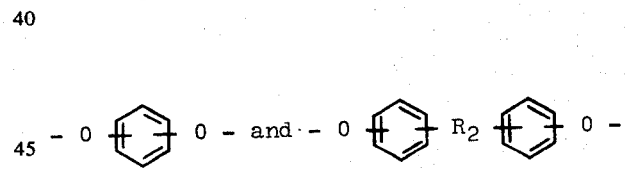

where $R_2$ is selected from the group consisting of
—$CH_2$—, —O—,

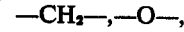

and

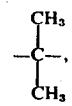

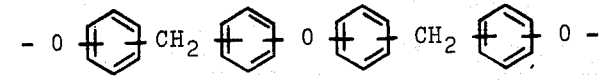

and $n$ is an average of about 0, with 2. about 20 to about 80% of at least one non-hydroxylated drying oil, in the presence of
3. about 0.0025 to about 0.1% (based on weight of (1) plus (2) of a catalyst selected from the group consisting of alkali and alkaline earth metal compounds which have a pH greater than 7.

2. A method according to claim 1 wherein said heating is at about 200° to about 250°.

3. A method according to claim 1 wherein said compound is a salt of a monocarboxylic organic acid having the formula R-COOH where R is aliphatic from $C_8$ to $C_{20}$, said salt having a pH less than 11 for 0.1 gm equivalent weight per liter.

4. A method according to claim 1 wherein said salt is a lithium salt and R is aliphatic from $C_{12}$ to $C_{20}$.

5. A method according to claim 4 wherein said salt is lithium ricinoleate.

6. A method according to claim 1 wherein $R_1$ is 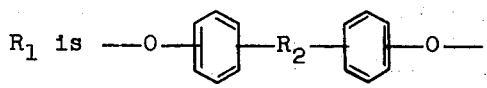

and $R_2$ is

7. A method according to claim 1 wherein $R_1$ is

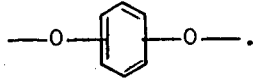

8. A method according to claim 1 wherein said drying oil is linseed oil.

9. A method according to claim 1 wherein about 40 to about 60% diglycidyl ether is reacted with about 40 to about 60% drying oil.

10. A method according to claim 1 wherein said reaction is performed under a blanket of a gas that is inert to all reactants.

11. A method according to claim 1 including the additional step of curing said liquid modified epoxy resin.

12. A method according to claim 11 wherein said resin is cured with about 80 to 95 stochiometric percent of an anhydride curing agent.

13. A method according to claim 12 wherein said anhydride curing agent is methyl tetrahydrophthalic anhydride.

* * * * *